Feb. 8, 1927.
M. HUTCHINSON
1,617,211
WOODWORKING MACHINE
Filed May 2, 1924
2 Sheets-Sheet 1
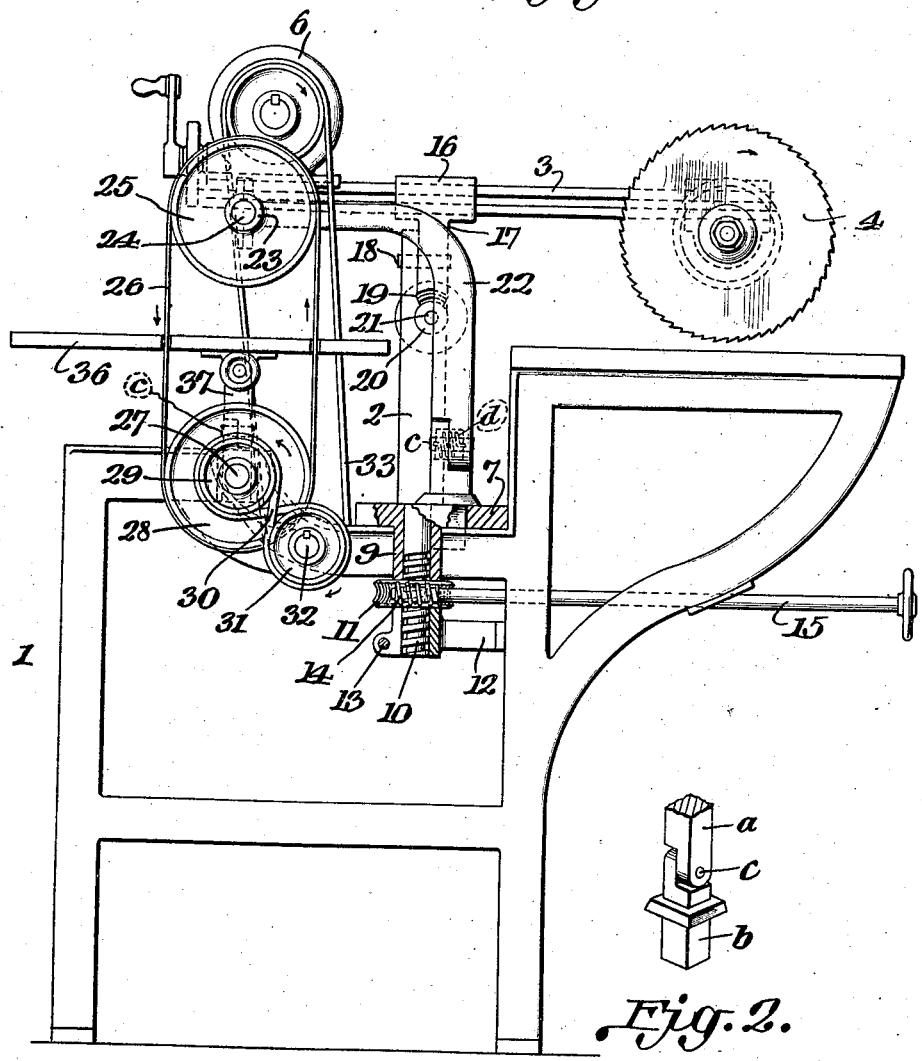

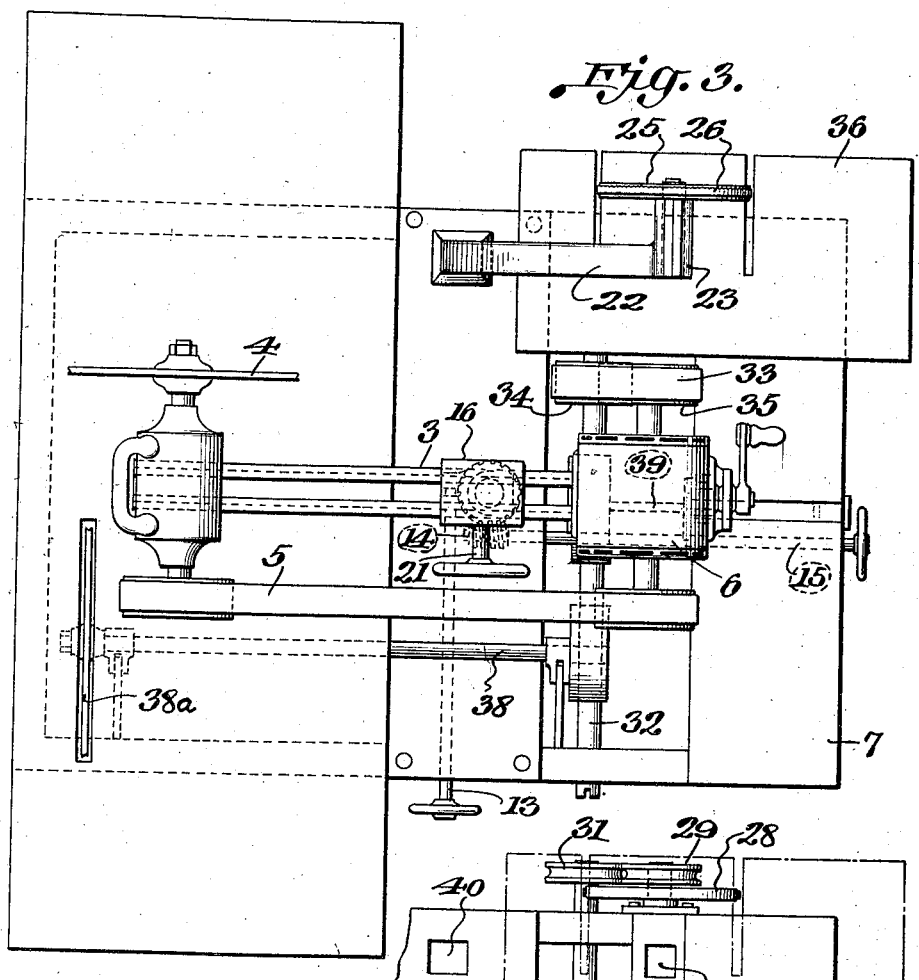
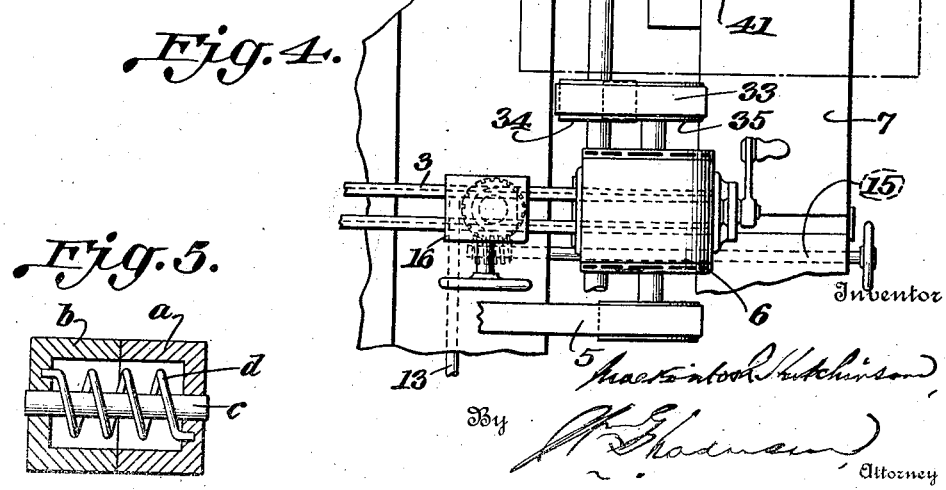

Patented Feb. 8, 1927.

1,617,211

UNITED STATES PATENT OFFICE.

MACKINTOSH HUTCHINSON, OF PHILADELPHIA, PENNSYLVANIA.

WOODWORKING MACHINE.

Application filed May 2, 1924. Serial No. 710,643.

My invention relates to wood-working machines, more especially of the type in which various operations such as cross-cut sawing, rip-saw sawing, jointing, sand abrading or finishing, and other operations are capable of performance by the same machine. The present invention has to do more particularly with the provision of a band-saw, and has for its object to provide a construction wherein the band-saw elements are capable of displacement and replacement so that the same may be readily displaced from operative position so as not to interfere with the operation of other elements of the machine when the band-saw is not to be used, and in which also the band-saw can be readily applied for operation when needed, and when not needed can be readily detached or displaced so as to be out of the way in other operations of the machine.

To the accomplishment of the foregoing and such other objects as may hereinafter appear the invention consists in the features hereinafter particularly described and then sought to be clearly defined by the claims, reference being had to the accompanying drawings forming a part hereof, and in which—

Figure 1 is a side view of so much of a wood-working machine as necessary to illustrate the band-saw features;

Figure 2 is a detail of a construction for removal or displacement of a band-saw work-table;

Figure 3 is a plan view of Figure 1;

Figure 4 is a plan similar to Figure 3 with parts broken away and the band-saw supporting arm and work-table and post omitted;

Figure 5 is a detail showing one manner of hinging the band-saw and band-saw table posts with cushioning spring for tilting the parts.

In the drawings the numeral 1 designates a machine frame of any approved type from which rises a post or standard 2 from which is supported a reciprocating carriage 3 carrying a cross-cut saw 4 driven by a belt 5 connection with a suitable motor 6, all of which may be of any approved type. The post 2 passes through a bed-plate 7 supported by a part of the machine frame and from which depends a sleeve 9 in which a reduced portion of the post fits, such reduced portion having screw-threads 10 to which is fitted an internally threaded worm wheel 11 lying between the adjacent ends of the transversely divided sleeve, the lower portion of the sleeve being supported by a bracket 12 and split so that it may be contracted by a threaded hand operated shaft 13 for clamping the post and holding it in its adjusted rotary position for having the cross-cut saw cut at the angle to which it may be set. A worm 14 on the end of a shaft 15 meshes with the worm 11 so as to raise or lower the post 2 as desired. The carriage 3 travels in a carriage-way 16 formed with a depending ear 17 having an arcuate slot through which passes a bolt 18 for securing the track-way to the upper part of post 2, and the lower face of the ear is formed with worm teeth 19 with which will engage a worm 20 on a hand operated shaft 21 for tilting the carriage side-ways to have the cross-cut saw cut at the inclination desired. The several features described are not essential to the present invention and other constructions may be used for the operations specified involving the rotation or swinging of the carriage and motor in a horizontal plane to bring the motor into position for connection with various other functioning elements of a wood-working machine of the general type mentioned, and in which I have found it of material advantage to provide a band-saw construction that will not interfere with the swinging of the motor to bring it into the various adjustments necessary for the operation of various elements of the machine.

Considering now the invention in the band-saw construction, this embodies an upright overhanging arm 22 provided at its end with a suitable boxing 23 in which is journaled a shaft 24 carrying a wheel or pulley 25 for the upper part of the band-saw 26. At a lower plane, say, on a stud shaft 27 is carried a wheel or pulley 28 for the lower part of the band-saw, and on the same shaft is another pulley 29 which receives a belt 30 running from a pulley 31 on a countershaft 32 driven by a belt 33 passing around a pulley 34 on the shaft and driven by a pulley 35 on the shaft of the motor 6. The work table 36 of the band-saw is supported by a post 37 sustained from a suitable part of the machine frame. For some kinds of work, for instance in driving the shaft 38 of a rip-saw 38ª, or the shaft 39 of a jointer, it is necessary to swing the motor 90 degrees from the position shown in the drawings in order to bring the driving pulley of the motor in position to be belted to the rip-saw shaft, or the jointer shaft. In order that the band-saw construction may not interfere with such swinging of the motor, or when it is desired that the machine may be free from the elevated positions of the band-saw and its table for any other reason, I provide for the removal or displacement of the band-saw elements and the band-saw table, so that the same may be brought into operative positions only when they are to be used. With that end in view I form a socket 40 in a suitable part of the machine frame in which the overhanging arm 22 removably fits, and a socket 41 is likewise formed in the machine frame in which the band-saw table post 37 removably fits. When the band-saw is not to be used the overhanging post of the band-saw and the band-saw table post are lifted out of their sockets and removed from the machine so as to be out of the way. Instead of lifting both posts out of their sockets for their displacement, each post may be made in sections with one section hinged to the other so that the overhanging arm of the band-saw and the band-saw work table may be tilted and dropped alongside the machine frame out of the swinging path of the motor. As both posts may be formed alike in that particular, the following description will be understood to apply to each of the two posts. As illustrated in Figure 2 one section a may be hinged to the other section b by a pintle c so that the upper section and the member carried by it may be turned down out of the way to one side of the machine frame. To relieve the operator of the weight of the members carried by the posts, which are quite heavy, and to facilitate the operation of lowering the parts, a spring may be employed which will serve to take up some of the weight and serve as a cushion in lowering the parts. Figure 5 illustrates one form of spring that may be used, and in which the coil or spiral spring d encircles the pintle and has its ends connected to the two sections of the post so that when the upper section is turned on the lower section the spring is placed under tension and takes up some of the weight of the members being lowered. When the parts are lowered any suitable fastening means may be employed for locking them in their lowered positions. Both constructions for displacement of the band-saw carrying post and band-saw table post may be embodied in the post displacement feature of the invention and either one availed of for the displacement of the parts as may be preferred by the operator. The characteristic feature of this part of the invention is the provision of means for displacement of the band-saw supporting post or arm and displacement of the band-saw work table whatever be the other elements and their construction forming a part of the wood-working machine.

I have illustrated and described with particularity the best embodiment of the invention at this time known but it is to be understood that changes in details may be made without departing from the invention as sought to be defined in the appended claims.

Having described my invention and set forth its merits what I claim is:—

1. A woodworking machine comprising a traveling carriage supported to swing in a horizontal plane and provided with a motor and a cross-cut saw driven from the motor, a shaft carrying a cutting-tool and provided with a pulley positioned to be driven by connection with the motor of the carriage in one position of the motor, and a band-saw positioned at one side of the machine frame to be driven from the motor, the band-saw structure comprising an arm carrying a band-saw supporting wheel, the arm being displaceable out of the range of swing of the motor carriage to bring the motor to position for connection with the drive pulley of the cutting-tool shaft.

2. A woodworking machine comprising a traveling carriage supported to swing in a horizontal plane and provided with a motor and a cross-cut saw driven from the motor, a shaft carrying a cutting-tool and provided with a pulley positioned to be driven by connection with the motor of the carriage in one position of the motor, a band-saw positioned at one side of the machine frame to be driven from the motor, the band-saw structure comprising an arm carrying a band-saw wheel, the arm being displaceable out of the range of swing of the motor-carriage to bring the motor to position for connection with the drive pulley of the cutting-tool shaft, and a displaceable band-saw work table adapted to be brought into operative relation to the band-saw when the supporting arm of the latter is positioned for actuation of the band-saw from the motor.

3. A wood-working machine comprising a band-saw and a band-saw work table positioned in operative relation one to the other, a hinged arm to support a band-saw carrying pulley, a hinged member supporting the work table, and a spring associated with the hinged arm and hinged member, each, adapted to be put under tension to function as a cushion when the arm and member are moved in a vertical plane from operative to inoperative position.

In testimony whereof I affix my signature.

MACKINTOSH HUTCHINSON.